United States Patent [19]
Hild et al.

[11] Patent Number: 5,634,601
[45] Date of Patent: Jun. 3, 1997

[54] GRANULATOR FOR STRAND MATERIALS

[75] Inventors: Friedrich Hild, Beilstein; Ulrich Kreuz, Erdmannhausen, both of Germany

[73] Assignee: C.F. Scheer & Cie GmbH & Co., Stuttgart, Germany

[21] Appl. No.: 416,727

[22] PCT Filed: Oct. 9, 1993

[86] PCT No.: PCT/EP93/02768

§ 371 Date: Jul. 31, 1995

§ 102(e) Date: Jul. 31, 1995

[87] PCT Pub. No.: WO94/09958

PCT Pub. Date: May 11, 1994

[30] Foreign Application Priority Data

Oct. 28, 1992 [DE] Germany ............... 42 36 451.5

[51] Int. Cl.⁶ .................................................. B02C 18/16
[52] U.S. Cl. .......................... 241/224; 241/242; 241/285.3
[58] Field of Search ................................... 241/224, 225, 241/222, 242, 243, 287, 288, 285.2, 285.1, 285.3; 83/349, 356.3

[56] References Cited

U.S. PATENT DOCUMENTS

| | | | |
|---|---|---|---|
| 1,603,763 | 10/1926 | Griffin | 241/225 X |
| 4,061,282 | 12/1977 | Walker et al. | 241/285.3 X |
| 4,759,248 | 7/1988 | Muller et al. | |

FOREIGN PATENT DOCUMENTS

| | | |
|---|---|---|
| 0013575 | 1/1980 | European Pat. Off. . |
| 0 013 575 | 7/1980 | European Pat. Off. . |
| 2162471 | 7/1973 | France . |
| 1454777 | 4/1969 | Germany . |
| 2538175 | 3/1977 | Germany . |
| 656075 | 6/1986 | Switzerland ............ 241/285.3 |
| 655185 | 6/1948 | United Kingdom . |
| 770704 | 1/1955 | United Kingdom . |
| 1129874 | 1/1967 | United Kingdom . |

*Primary Examiner*—Mark Rosenbaum
*Attorney, Agent, or Firm*—Leydig, Voit & Mayer, Ltd.

[57] ABSTRACT

In order to simplify cleaning work in a granulator for strand materials with a feed device for taking up the strand material and conveying it to a subsequent shearing blade roller which rotates contrary to the direction of conveyance of the strand material and operates against a stationary anvil blade, wherein the feed device comprises a lower and an upper feed roller, of which at least one is drivable, wherein a wiper blade is associated with the lower feed roller, and wherein the wiper blade and the anvil blade are fixed in position on a carrier arranged between the lower feed roller and the shearing blade roller, it is suggested that the lower feed roller be movable between an operating and a non-operating position, wherein in its non-operating position the lower feed roller is arranged at a distance from the carrier and the wiper blade, and that the lower feed roller be lockable in its operating position.

6 Claims, 5 Drawing Sheets

GRANULATOR FOR STRAND MATERIALS

The invention relates to a granulator for strand materials with a feed device for taking up the strand material and conveying it to a subsequent shearing blade roller which rotates contrary to the direction of conveyance of the strand material and operates against a stationary anvil blade, wherein the feed device comprises a lower and an upper feed roller, of which at least one can be driven, wherein a wiper blade is associated with the lower feed roller and wherein the wiper blade and the anvil blade are secured in position on a carrier arranged between the lower feed roller and the shearing blade roller.

Granulators for strand materials, i.e. strands of plastic and rovings etc., of the type described at the outset are known (DE 29 01 018 A1).

The forces occurring on the bearings of the feed device as well as the shearing blade roller during strand granulation are very large and require a construction of the bearings which is of an adequately stable design. In addition, it is important that an extremely fine gap which is exactly adjustable can be provided between the lower feed roller and the wiper blade during operation and an even more exact adjustment is necessary between the shearing blade roller and the anvil blade. Only when these conditions are fulfilled can a high-quality granulate be produced and an interference-free operation of the granulator ensured.

Up until now it has been necessary for cleaning of the granulator, for example when changing the material to be granulated, to dismount or remove the lower feed roller when it is to be ensured that none of the material processed beforehand is carried into the granulate to be processed thereafter.

The possibility of cleaning the shearing blade roller is somewhat better since this does not constantly abut on the anvil blade but essentially releases the anvil blade in the interval between two consecutive cuts of the blade roller.

However, work to be carried out on the carrier for wiper blade and anvil blade has always necessitated the removal of at least the lower feed roller or the shearing blade roller.

The object of the invention is to propose a granulator in which cleaning work is simplified in the region between lower feed roller and carrier or between carrier and shearing blade roller.

This object is accomplished in accordance with the invention, in a granulator of the type described at the outset, in that the lower feed roller is movable between an operating and a non-operating position, wherein in its non-operating position it is arranged at a distance from the carrier and the wiper blade, and that the lower feed roller is lockable in its operating position.

Surprisingly, it has been found that despite the forces occurring in the granulator the feed roller can be designed to be movable between an operating and a non-operating position when this can be securely locked in its operating position.

When the locking means is released, it is possible for the lower feed roller to move out of the operating into the non-operating position, the space between the lower feed roller and the wiper blade thereby being increased at the same time and made accessible for cleaning and other control measures.

When identical strand materials are continuously processed in a granulator, the aspect of improved cleaning capabilities in the region between the lower feed roller and the wiper blade is of secondary importance whereas the ease of maintenance with respect to the shearing blade roller or the associated anvil blade, which is normally subject to wear and tear more quickly than the shearing blade roller, is of greater significance. Alternatively to the first solution, it is possible in this case for the shearing blade roller of a granulator of the type described at the outset to be movable between an operating and a non-operating position, whereby in its non-operating position it is arranged at a distance from the carrier and from the anvil blade, and for the shearing blade roller to be lockable in its operating position.

It is, of course, possible for both the shearing blade roller and lower feed roller to be movable between an operating and a non-operating position so that the carrier for wiper blade and anvil blade is accessible from both sides, i.e. not only from the side of the lower feed roller but also from the side of the shearing blade roller, for cleaning work or maintenance and service work, for example for exchanging the anvil blade.

It is preferable for the lower feed roller and/or the shearing blade roller to likewise be lockable in their non-operating positions. This reduces the risk of damage to these elements of the granulator and helps to avoid accidents during maintenance and cleaning work.

In a further, preferred embodiment, the carrier, preferably a common carrier for wiper blade and anvil blade, can be moved from an operating into a non-operating position and can be secured in the operating position.

With this option it is possible, even in granulators in which only the lower feed roller or only the shearing blade roller are mounted so as to be movable between an operating and a non-operating position, to bring about an increase in the distance from the respectively stationary roller which improves at least the cleaning possibilities. If the operating and non-operating positions are far enough apart from one another, this offers the possibility of exchanging the anvil blade from the side of the shearing blade roller, as well, without removing the shearing blade roller of the granulator.

The feed device is often driven via the lower feed roller while the upper feed roller is taken along as friction-driven roller. The drive for the lower feed roller is normally synchronized with the drive for the shearing blade roller, for example via a toothed-wheel gearing.

Surprisingly, it has been found that when a pivoting movement is carried out for the movement of the lower feed roller or the shearing blade roller out of the operating into the non-operating position and back again, problems with the re-engagement in one another of the gear wheels of the gearing synchronizing the feed roller with the shearing blade roller can be avoided, even if one or other of the rollers has, in the meantime, be turned a little.

The absorption of force during the mounting of the lower feed roller or the shearing blade roller and their locking in the operating position is advantageously uncoupled by the lower feed roller and/or the shearing blade roller being supported on both sides by supporting elements in their respective operating positions.

From a safety point of view, the lower feed roller and/or the shearing blade roller should preferably be lockable on both sides in their respective operating positions, this means that two locking mechanisms operating independently of one another are present on both sides of the respective rollers.

With respect to operating safety, the granulator is preferably equipped with an attachable handling device, by means of which the locking means of the lower feed roller or the shearing blade roller can be released in a compulsory two-handed operation in the operating position and, where applicable, also in the non-operating position. This ensures that the operator has both hands on the handling device and thus away from the danger area when the locking means for one or other of the rollers is released. The handling device preferably comprises a bar which forms a lever for pivoting the roller(s) from the one position into the other.

The invention will be explained in greater detail in the following on the basis of the drawings.

Figure 1:
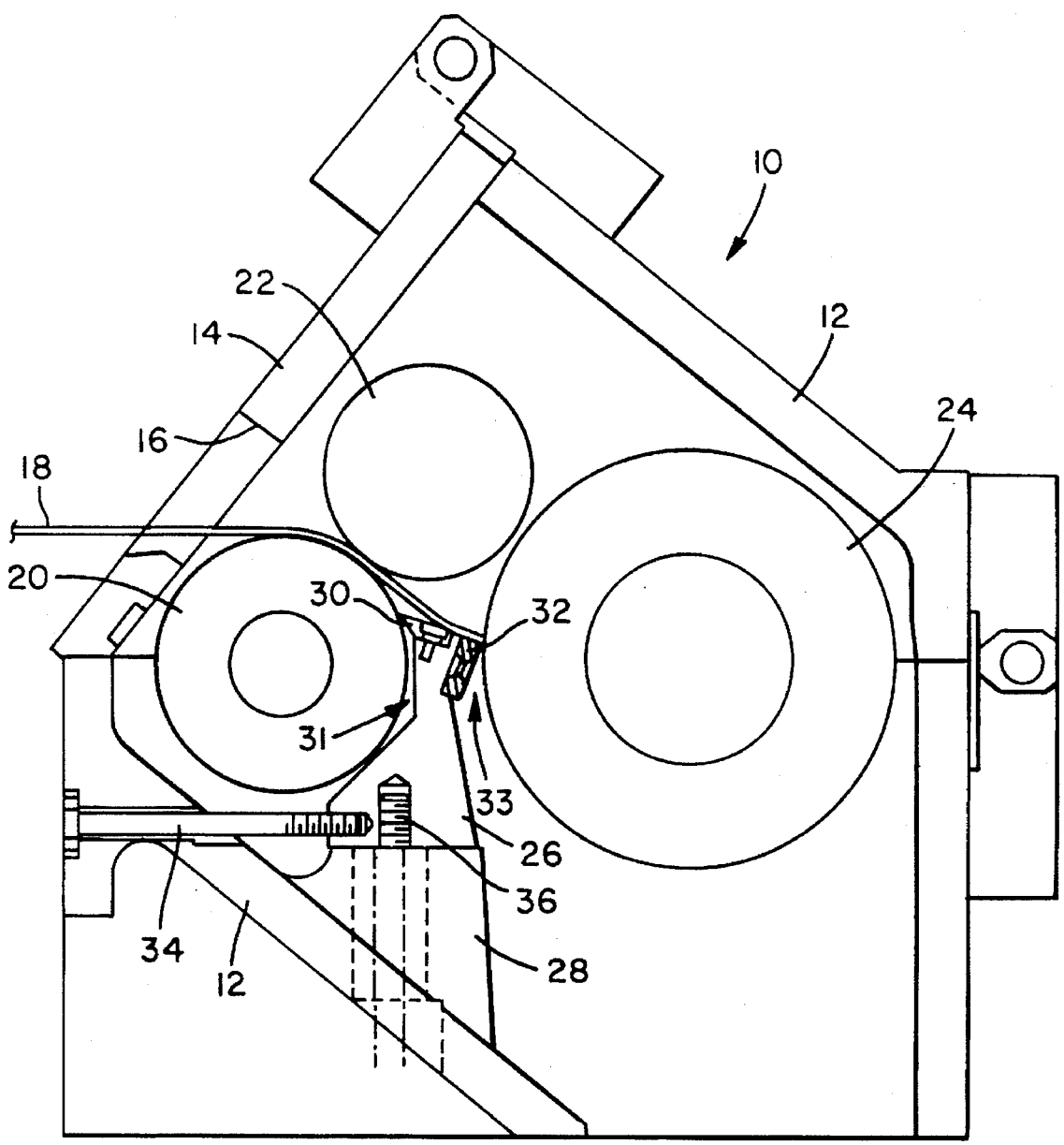
FIG. 1 is a sectional view through a closed granulator.

FIG. 1 shows a granulator designated as a whole with the reference numeral 10 and comprising a housing 12 which can be closed at its front upper side by means of a cover 14. The cover 14 includes a passageway 16, through which strand material 18 passes into the granulator 10. The strand material 18 is taken up in the interior of the granulator first of all by a lower feed roller 20 and conveyed between this and an upper feed roller 22 at a defined speed to a shearing blade roller 24. The lower and the upper feed rollers as well as the shearing blade roller 24 are illustrated only schematically with their outer circumferences.

A carrier 26 is arranged between the lower feed roller 20 and the shearing blade roller 24 and this carrier is secured to a base portion 28 of the housing 12. At its upper side the carrier 26 holds a wiper blade 30 oriented in the direction towards the lower feed roller 20 and an anvil blade 32 parallel thereto but oriented towards the shearing blade roller 24. The wiper blade 30 serves to clean the lower feed roller 20, which is often structured, abuts more or less slidingly on this roller and cleans it of residual strand material.

The anvil blade 32 forms with the cutters (not illustrated) of the shearing blade roller 24 an extremely narrow, adjustable gap.

During the course of time it will be necessary to resharpen the blades of the shearing blade roller 24 which results in a reduction in the diameter of the shearing blade roller. To compensate for this, the carrier 26 can be displaced in the direction towards the shearing blade roller 24 via adjusting bolts 34, whereby the adjustment of the wiper blade 30 in relation to the lower feed roller 20 must then, of course, be checked.

It is apparent from FIG. 1 that the space 31 between the lower feed roller 20 and the carrier 26 is, in particular, very small and without dismounting the roller 20 hardly permits any cleaning which will prevent with adequate certainty the presence of any foreign material in the batch following a batch change.

The present invention solves this problem by utilizing the space present in the housing when the cover 14 is opened for a movement of the lower feed roller out of an operating position into a non-operating position.

Figure 2:
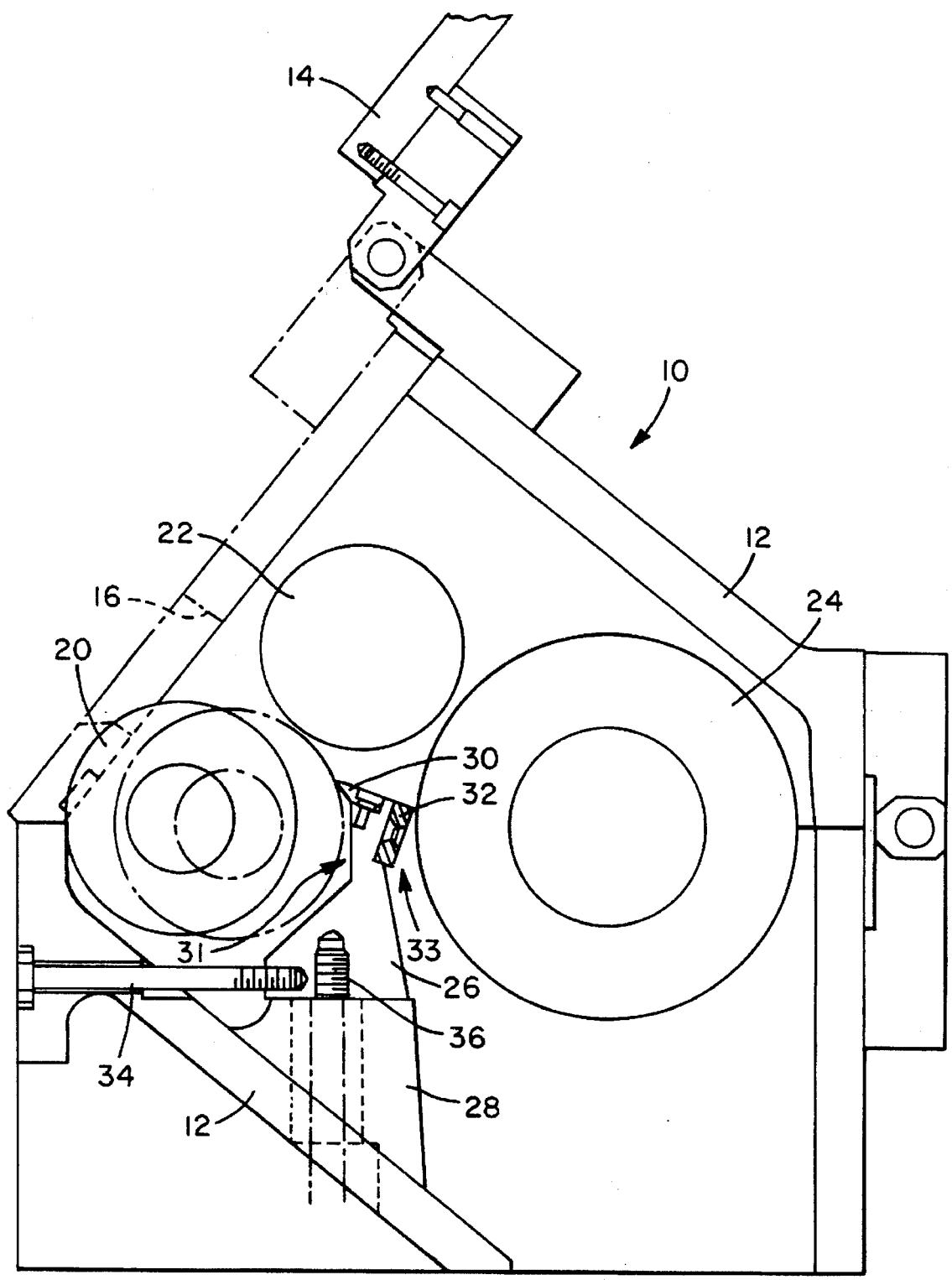
FIG. 2 is a sectional view through the granulator according to FIG. 1 with its cover opened.

With respect to the further description, reference is made to FIG. 2 which shows the granulator 10 from FIG. 1 with the cover 14 opened.

In FIG. 2, the lower feed roller 20 is illustrated as a dash-dot line in its operating position whereas the solid-line illustration shows the lower feed roller 20 in its non-operating position.

The upper feed roller 22 is preferably mounted so as to be pivotable and can be swung out of the space between the lower feed roller 20 and the shearing blade roller 24. This means that the space above the lower feed roller 20, the carrier 26 and the shearing blade roller 24 is fully accessible for cleaning and maintenance work.

Subsequently, the lower feed roller 20 is then pivoted out of the operating position (FIG. 2, dash-dot line illustration) into the non-operating position (FIG. 2, solid line illustration) and so the space 31 between the lower feed roller 20 and the carrier 26 is also well accessible for cleaning and/or maintenance work.

The same principle can, of course, apply to the movement of the shearing blade roller 24 between an operating and a non-operating position, whereby this moves in the opposite direction to the lower feed roller 20. If both the lower feed roller 20 and the shearing blade roller 24 are movable back and forth between a non-operating and an operating position, it is possible to make the carrier 26 freely accessible from both sides for cleaning and maintenance work without having to remove one of the two rollers, which would entail a considerable amount of work.

In a further embodiment of the invention, it can already be sufficient for one of the two rollers, namely the lower feed roller 20 or the shearing blade roller 24, to be movable between an operating and a non-operating position in order to make both spaces, i.e. not only the space between the carrier 26 and the lower feed roller 20 but also the space 33 between the carrier 26 and the shearing blade roller 24, accessible for cleaning and maintenance work since, in this case, the carrier 26 itself is likewise movable back and forth between an operating and a non-operating position.

FIGS. 1 and 2 show a securing bolt 36 which holds the carrier 26 in its operating position. Once the securing bolt 36 is released, the carrier 26 is accessible due to movement into a non-operating position (not shown) which could, for example in the case of FIG. 2, take place towards the left.

The adjusted operating position for the carrier 26 is defined by a stop element on the adjusting bolt 34 so that the carrier 26 can travel back into its old position again and then be secured in place by means of the securing bolt 36.

Figure 3:
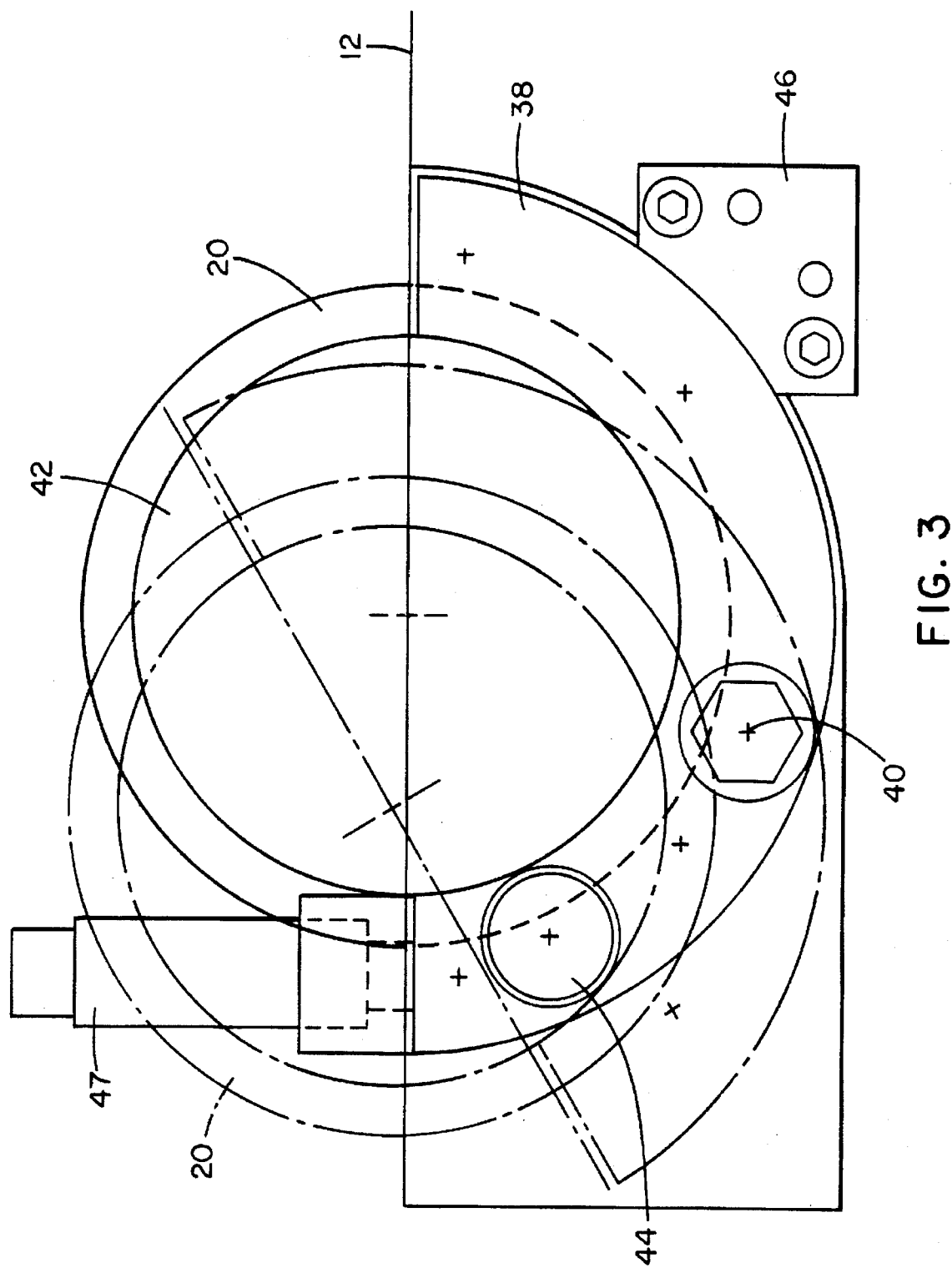
FIG. 3 shows a detail of a mounting for a feed roller of the granulator according to FIGS. 1 and 2.

FIG. 3 shows in somewhat greater detail one of the possible embodiments for a pivotable mounting of the lower feed roller 20. The lower feed roller 20 is merely shown in its operating and in its non-operating position in the form of circumferential circles. FIG. 3 shows a pivotable bearing shell 38 which is pivotable about the point of rotation 40 through a predetermined angle. The bearing shell 38 clamps a pivot bearing 42 (illustrated only with its outer circumference) and can be locked on the housing 12 by means of a locking bolt 44 in the operating and in the non-operating position. In the operating position, the bearing shell 38 abuts with its outer circumference, in addition, on the support 46 which, together with the pivot bearing 40, absorbs all the forces acting via the lower feed roller 20 so that the locking bolt 44 need only fulfill the function of securing the position of the roller 20 either pivoted into the operating position or pivoted into the non-operating position.

Figure 4:
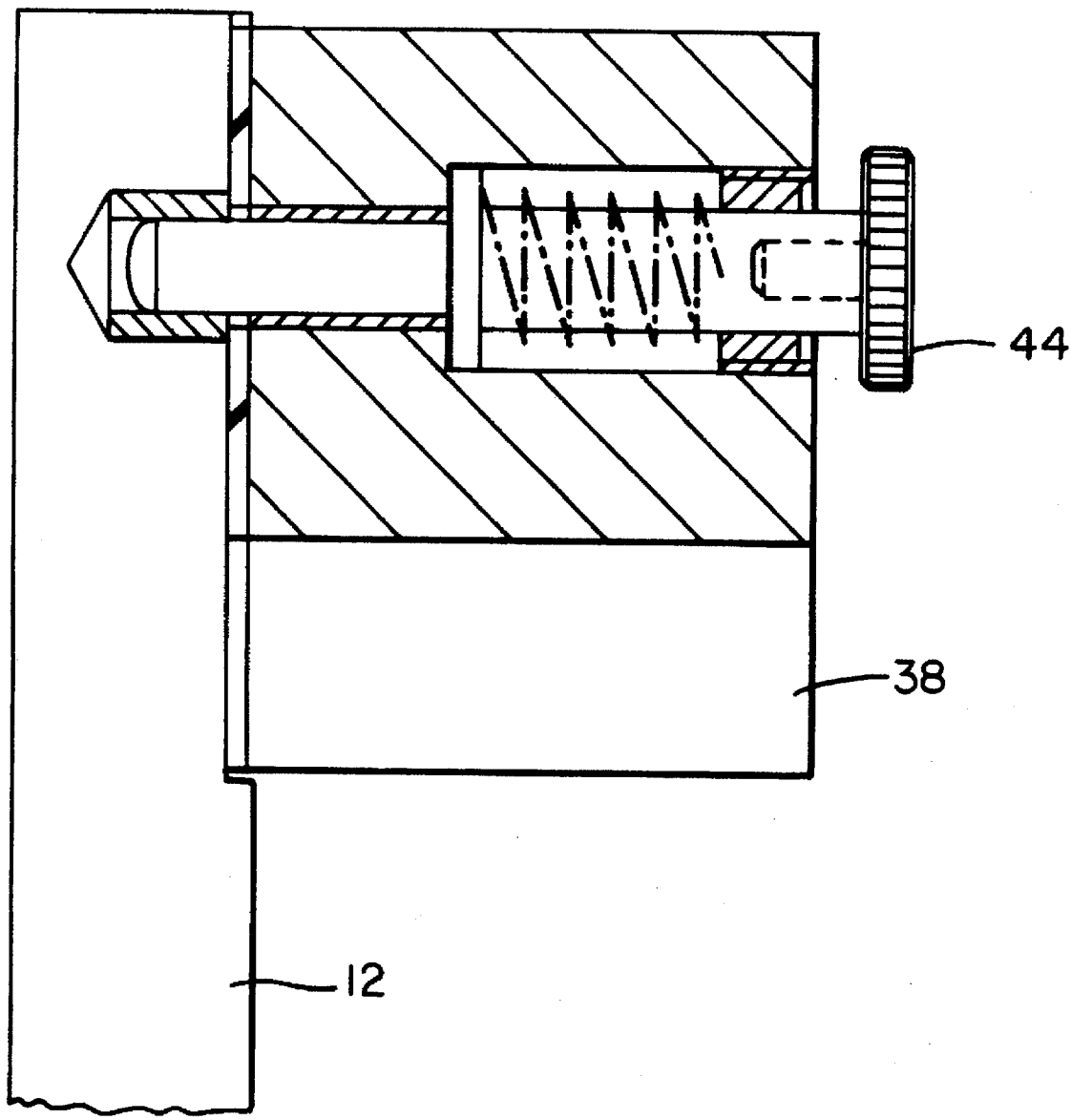
FIG. 4 shows a locking bolt for fixing the lower feed roller in the operating position.

FIG. 4 shows in detail a solution for a locking bolt 44 in the locked stated.

Figures 5, 6:
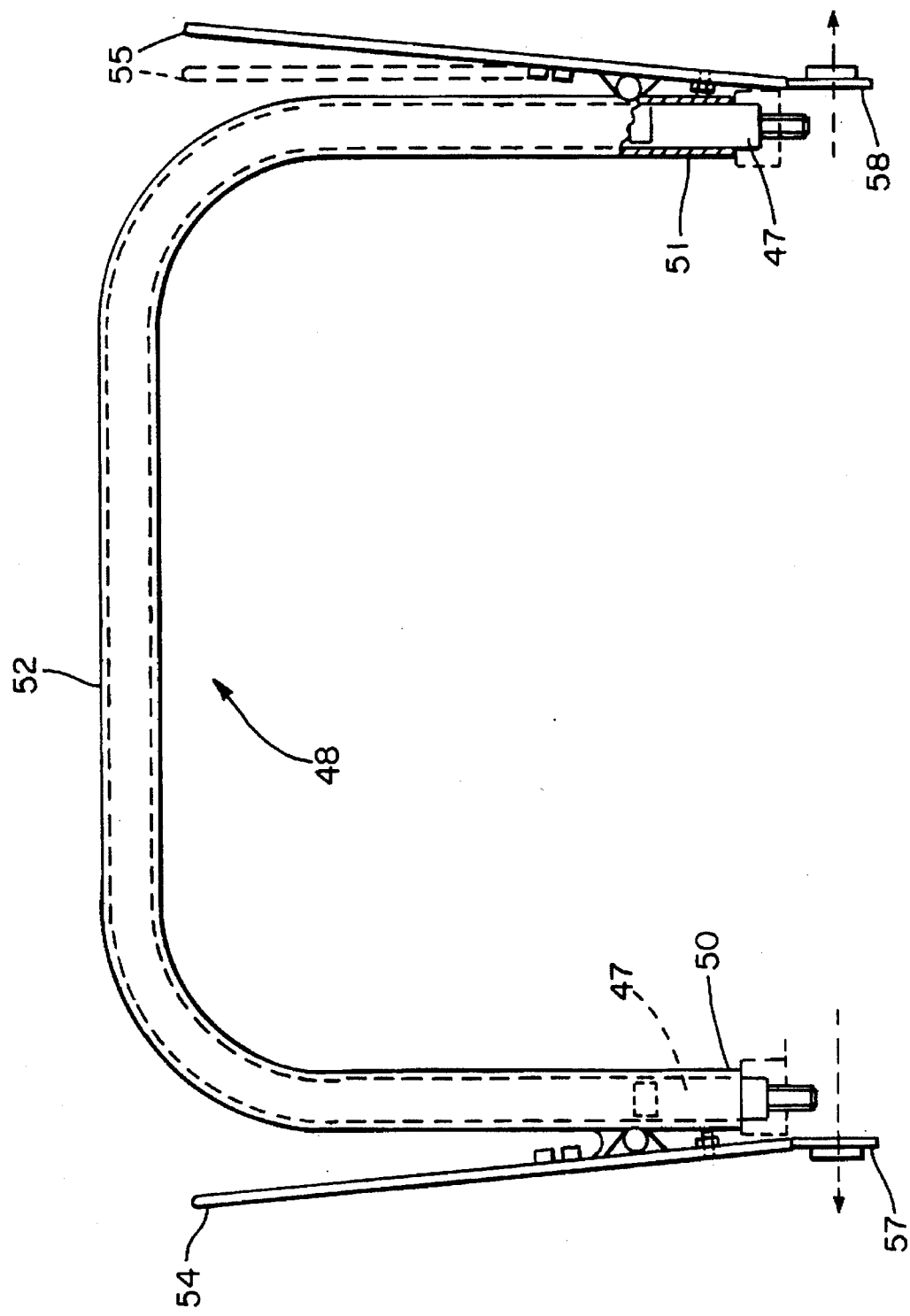
FIG. 5 shows a handling device for pivoting the lower feed roller.
FIG. 6 is a side view of the handling device from FIG. 5.

Finally, FIGS. 5 and 6 show a handling device 48 which can be placed on the bearing shell 38 (pin 47) from above with its free ends 50, 51. The two ends 50, 51 of the handling device 48 are connected via a bar 52. Two unlocking levers 54, 55 are arranged on either side of the bar 52 and these levers engage behind the heads of the locking bolts 44 with their free ends 57, 58 adjacent the free ends 50, 51. The distance between the two levers 54, 55 is selected such that these can be pressed at the same time only with two hands so that any disengaging of the locking bolts 44 on both sides of the roller 20 can take place only with a two-handed operation.

The bar 52 can be used at the same time to initiate the pivoting movement for the roller 20 and to transfer this securely into the non-operating position. The levers 55, 54 are then released again so that the locking bolts 44 can lock into the housing 12 again on both sides of the roller, and the roller 20 is fixed in its non-operating position.

The mode of operation of the handling device as described in the above applies, of course, in the same way when the granulator is provided with a pivotable shearing blade roller.

We claim:

1. Granulator for strand materials with a feed device for taking up the strand material and conveying it to a subsequent shearing blade roller rotating contrary to the direction of conveyance of the strand material, said roller operating against a stationary anvil blade, wherein the feed device comprises a lower and an upper feed roller, at least one of said rollers being drivable, wherein a wiper blade is associated with the lower feed roller, and wherein the wiper blade and the anvil blade are fixed in position on a carrier arranged between the lower feed roller and the shearing blade roller, characterized in that the lower feed roller (20) is movable between an operating and a non-operating position, wherein in its non-operating position it is arranged at a distance from the carrier (26) and the wiper blade (30), and that the lower feed roller (20) is lockable in its operating position, wherein said granulator includes a housing (12), said feed device located within said housing, wherein said lower feed roller (20) is housed in a pivotable bearing shell (38), wherein said pivotable bearing shell (38) is pivotable through a predetermined angle between a first position corresponding to said operating position of said lower feed roller and a second position corresponding to said non-operating position of said lower feed roller, wherein said granulator includes means for releasably locking said pivotable bearing shell (38) onto and off of said housing (12) of said granulator in each of said first and second positions.

2. Granulator as defined in claim 1, wherein said means for locking and unlocking said pivotable bearing shell (38) onto and off of said housing (12) comprises a pair of locking bolts (44) seatable in said housing (12), wherein said granulator further includes a handling device (48), said handling device including a pair of unlocking levels (54, 55) for unseating said locking bolts (44), wherein said handle is a level for said pivotable bearing shell (48).

3. Granulator as defined in claim 1, wherein said housing (12) includes a support (46), wherein said bearing shell (38) abuts on said support (46) when said bearing shell (38) is in said first position.

4. Granulator for strand materials with a feed device for taking up the strand material and conveying it to a subsequent shearing blade roller rotating contrary to the direction of conveyance of the strand material, said roller operating against a stationary anvil blade, wherein the feed device comprises a lower and an upper feed roller, at least one of said rollers being drivable, wherein a wiper blade is associated with the lower feed roller, and wherein the wiper blade and the anvil blade are fixed in position on a carrier arranged between the lower feed roller and the shearing blade roller, characterized in that the shearing blade roller (24) is movable between an operating position and a non-operating position, wherein in its non-operating position it is arranged at a distance from the carrier (26) and from the anvil blade (32), that the shearing blade roller (24) is lockable in its operating position, and that the lower feed roller (20) is movable when applicable between an operating and a non-operating position, wherein in its non-operating position it is arranged at a distance from the carrier (26) and the wiper blade (30), and wherein the lower feed roller (20) is lockable in its operating position, said granulator including a housing (12), wherein said feed device is located within said housing (12), wherein said shearing blade roller (24) is housed in a pivotable bearing shell (38), wherein said pivotable bearing shell (38) is pivotable through a predetermined angle between a first position corresponding to said operating position of said shearing blade roller and a second position corresponding to said non-operating position of said shearing blade roller, wherein said granulator includes means for releasably locking said pivotable bearing shell (38) onto and off of said housing (12) of said granulator in each of said first and second positions.

5. Granulator as defined in claim 4, wherein said means for locking and unlocking said pivotable bearing shell (38) onto and off of said housing (12) comprises a pair of locking bolts (44) seatable in said housing (12), wherein said granulator further includes a handling device (48), said handling device including a pair of unlocking levels (54, 55) for unseating said locking bolts (44), wherein said handle is a level for said pivotable bearing shell (48).

6. Granulator as defined in claim 4, wherein said housing (12) includes a support (46), wherein said bearing shell (38) abuts on said support (46) when said bearing shell (38) is in said first position.

* * * * *